INVENTOR.
Dale F. Becker,
BY Brown, Jackson,
Boettcher & Dienner
Attys

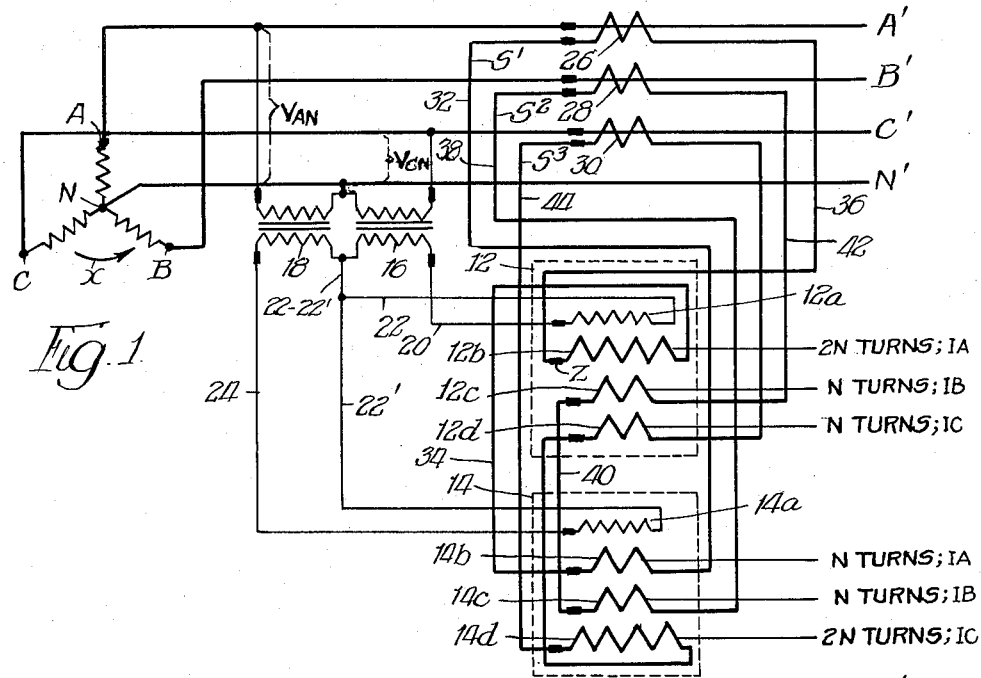

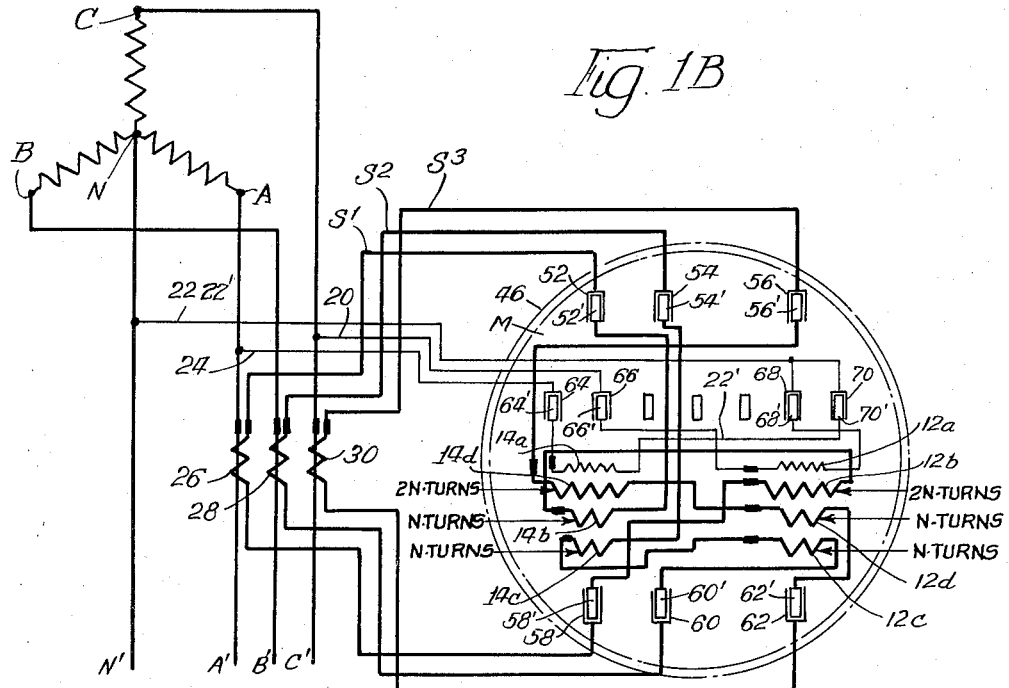
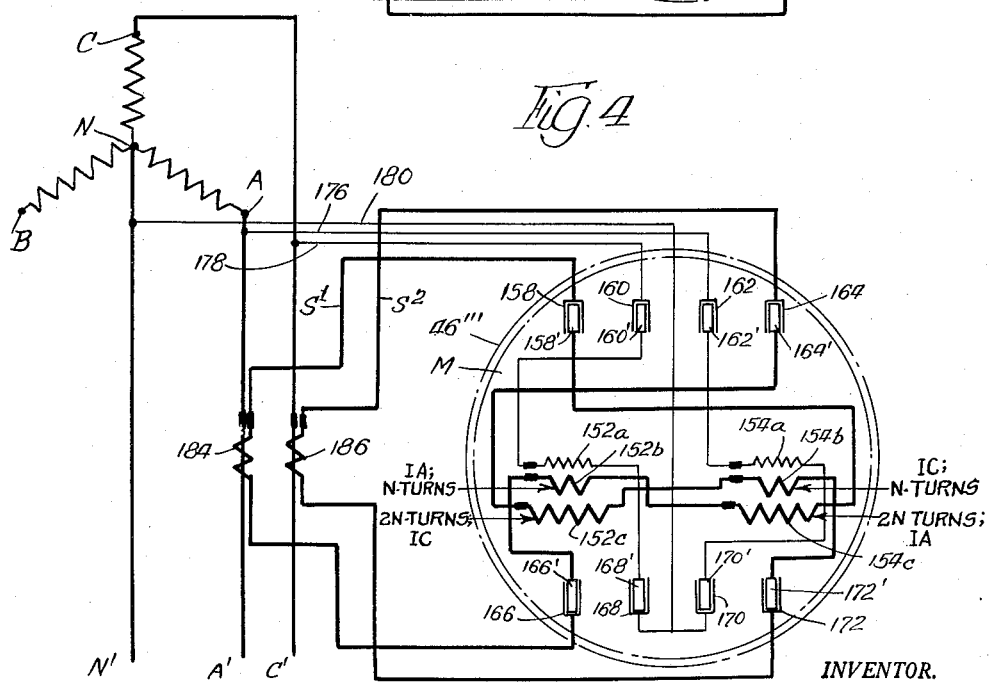

INVENTOR.
Dale F. Becker,
BY Brown, Jackson
Boettcher & Dienner
Attys

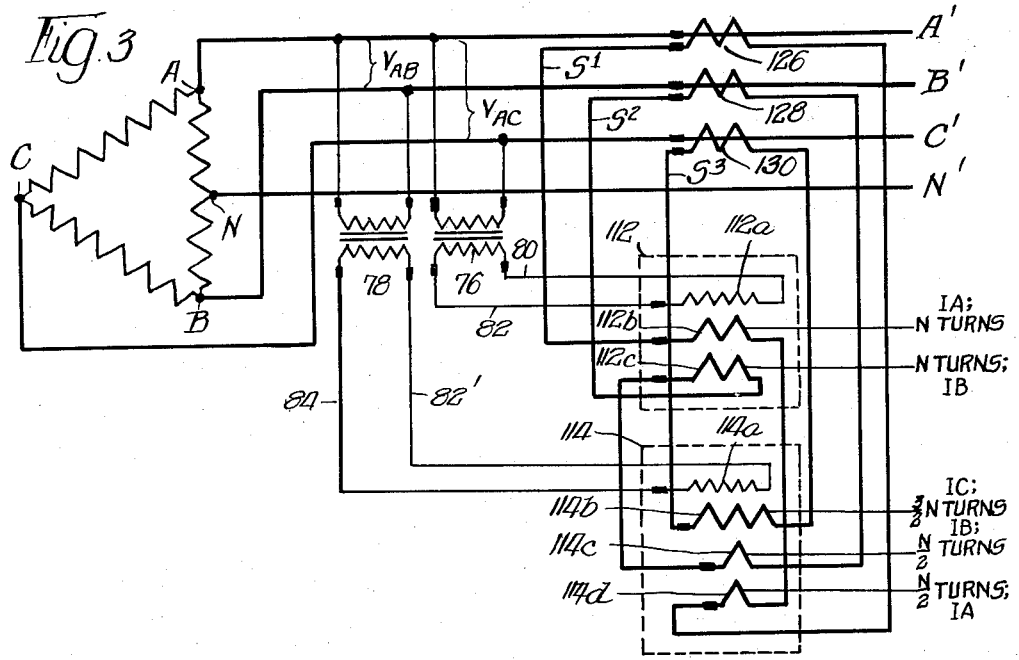
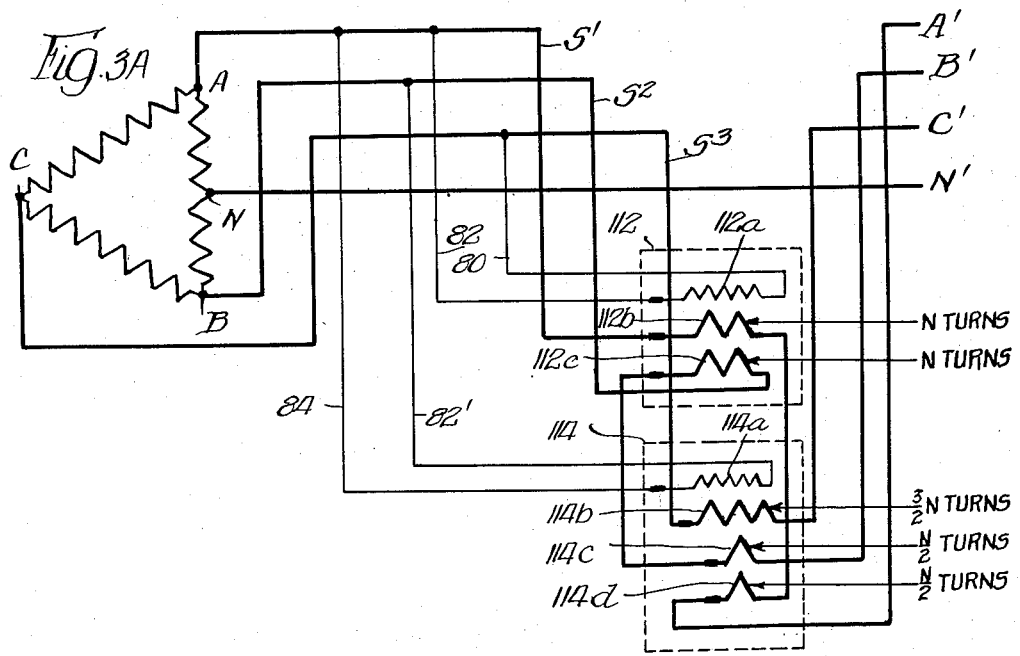

March 6, 1962  D. F. BECKER  3,024,416
VARHOUR METER
Filed April 21, 1959  6 Sheets-Sheet 6

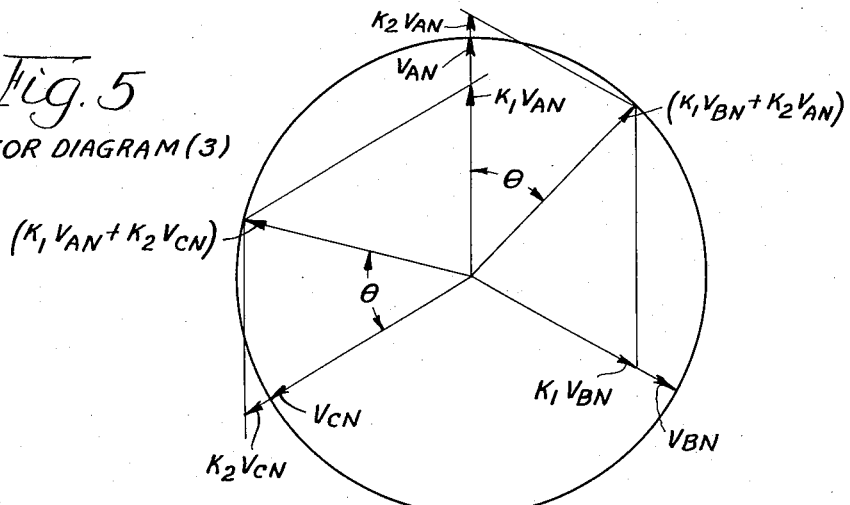

Fig. 5
VECTOR DIAGRAM (3)

Fig. 6.
WATTHOUR- VARHOUR- VOLTAMPEREHOUR CONNECTION SUMMARY

| $\theta$ | 4W Y | 4W Δ | 3W 3∅ | 3W NETWORK | QUANTITY MEASURED |
|---|---|---|---|---|---|
| 0° | $V_{AN}'(I_A-I_B)$ $+$ $V_{CN}'(I_C-I_B)$ | $V_{AB}(\frac{I_A-I_B+I_C}{2})$ $+$ $V_{AC}\cdot(-I_C)$ | $V_{AB}\cdot I_A$ $+$ $V_{CB}\cdot I_C$ | $V_{AN}'\cdot I_A$ $+$ $V_{CN}'\cdot I_C$ | WATTS WITH CURRENT LAGGING OR LEADING BETWEEN 0° AND 90° |
| 30° | $V_{AN}'(I_A-2I_B+I_C)$ $+$ $V_{CN}'(-I_A-I_B+2I_C)$ | $V_{AB}(\frac{I_A-I_B}{2}+\frac{3I_C}{2})$ $V_{AC}(\frac{I_A-I_B}{2}-\frac{3}{2}I_C)$ | $V_{AB}(2I_A+I_C)$ $+$ $V_{CB}(-I_A+I_C)$ | $V_{AN}'(I_A+I_C)$ $+$ $V_{CN}'(-I_A+2I_C)$ | $\sqrt{3}\cdot VA$ WITH CURRENT LAGGING 30° |
| 60° | $V_{AN}'(I_C-I_B)$ $+$ $V_{CN}'(I_C-I_A)$ | $V_{AB}\cdot I_C$ $+$ $V_{AC}(\frac{I_A-I_B-I_C}{2})$ | $V_{AB}(I_A+I_C)$ $+$ $V_{CB}(-I_A)$ | $V_{AN}'\cdot(I_C)$ $+$ $V_{CN}'(-I_A+I_C)$ | VA WITH CURRENT LAGGING 60° |
| 90° | $V_{AN}'(-I_A-I_B+2I_C)$ $+$ $V_{CN}'(-2I_A+I_B+I_C)$ | $V_{AB}(\frac{I_B-I_A}{2}+\frac{3}{2}I_C)$ $+$ $V_{AC}(I_A-I_B)$ | $V_{AB}(I_A+2I_C)$ $+$ $V_{CB}(-2I_A-I_C)$ | $V_{AN}'(-I_A+2I_C)$ $+$ $V_{CN}'(-2I_A+I_C)$ | $\sqrt{3}$ VAR WITH CURRENT LAGGING BETWEEN 0° AND 90° |

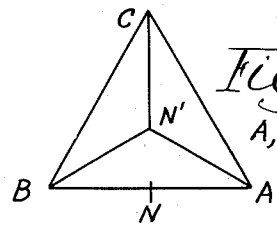

Fig. 6A
A,B,C Phase Sequence

INVENTOR.
Dale F. Becker,
BY Brown, Jackson,
Boettcher & Dienner
Att'ys.

United States Patent Office 3,024,416
Patented Mar. 6, 1962

3,024,416
VARHOUR METER
Dale F. Becker, Springfield, Ill., assignor, by mesne assignments, to Sangamo Electric Company, Springfield, Ill., a corporation of Delaware
Filed Apr. 21, 1959, Ser. No. 807,936
20 Claims. (Cl. 324—141)

The present invention relates primarily to varhour meters for measuring the reactive power on distribution systems, particularly polyphase systems.

Heretofore, the general method of measuring reactive power has been to utilize a substantially conventional watthour meter, and to connect thereto a phase-shifting auxiliary, such as an auto-transformer; or a resistor-condenser phase-shifting network etc., in order to effect the quadrature displacement of the potential, which is necessary for measuring reactive power components.

My invention departs from such early methods in that my improved varhour meter does not require these auxiliary devices such as auto-transformers, etc., but instead it effects the desired relative displacement of the potential fluxes and current fluxes solely by a unique relationship of number of turns in certain windings and by a unique electrical connection of the windings in the circuit.

One of the objects of the invention is to provide an improved varhour meter which operates upon the basis of utilizing the currents that are available and combining the magnetic fluxes therefrom within the meter elements to produce the desired registration. This is in contrast to a suggested prior practice of combining currents vectorily to produce desired currents in the meter coils.

By virtue of the foregoing operating relation of my invention, I am enabled to provide an improved varhour polyphase meter which is completely self-contained, i.e. wherein all potential instrument transformers can be dispensed with, and wherein all current instrument transformers can also be dispensed with, under installation conditions where the load voltages and the load currents on the line are within the working range of a normal or conventional meter structure. This completely "self-contained" feature is of decided importance because it reduces the cost of the latter meter installations by eliminating instrument transformers, and also by simplifying the labor and the required skill of the workman making the installation.

In this regard, one of the more particular objects of the invention is to provide a varhour meter capable of accurately measuring reactive power on a delta-connected, 3-phase, 3-wire system, wherein all instrument transformers for both voltages and the currents can be dispensed with when the prevailing voltages and currents on the system are within the practical working limits of the meter.

Another object of the invention is to provide a varhour meter capable of accurately measuring reactive power on a Y-connected 3-phase, 4-wire system, which also has this capability of dispensing with all instrument transformers.

Another object of the invention is to provide a varhour meter for accurately measuring reactive power on a delta-connected, 3-phase, 4-wire system, which likewise has this capability of dispensing with all instrument transformers.

Still another object of the invention is to provide a varhour meter capable of accurately measuring reactive power on a so-called "network" type of system consisting of three-phase, three-wire service as supplied from the neutral conductor and two phase conductors of a Y-connected, three-phase, four-wire source, which likewise has the capability of dispensing with all instrument transformers.

In each of the foregoing embodiments, the instrument transformers for the voltages may be dispensed with, while the instrument transformers for the currents may be retained, or vice-versa.

In this same regard, another object of the invention is to provide a varhour meter which can use the same current transformers as are used for the watthour meter, connected, for example, on the same distribution system and can also use these same current transformers at the same time.

Another object is to provide a varhour meter in which the internal connections are all such as to make the external connections identical to a similar watthour meter, thus permitting the exchange of my improved varhour meter with a watthour meter without changing socket connections. This has the additional advantage in that the meter installer installs the same socket connections in the same manner as for the standard watthour meter, and is therefore less likely to make mistakes in installing the varhour meter. Moreover, this arrangement enables a meter tester to establish external connections to the present varhour meter, when it is to be tested, with the same equipment that is ordinarily used for testing watthour meters.

A further advantage of my improved construction of varhour meter resides in the fact that in any of the above embodiments for use with any of the above described polyphase systems, the meter is built similarly to the present day design of polyphase watthour meters characterized by a multi-stator or a 2-element construction operating upon a single rotating disk.

Other objects, features and advantages of the invention will appear from the following detail description of certain preferred embodiments thereof. In the accompanying drawings illustrating such embodiments:

FIGURE 1 is a schematic circuit diagram of a 3-phase, 4-wire, Y-connected embodiment of my varhour meter, wherein the meter has voltage and current connections with the electrical distribution system through instrument transformers.

FIGURE 1A is a similar circuit diagram showing the same embodiment of varhour meter connected directly to the electrical supply system without the intervention of instrument transformers.

FIGURE 1B is a schematic view showing this latter embodiment of varhour meter constructed as a socket meter provided with plug-in prongs projecting therefrom for plug-in reception in a standard plug-in mounting socket, and showing the internal connections between the meter windings and these plug-in prongs.

FIGURE 3 is a schematic circuit diagram of a 3-phase, 4-wire, delta-connected embodiment of my varhour meter, wherein the meter has voltage and current connections with the electrical supply system through instrument transformers.

FIGURE 3A is a similar circuit diagram showing the same embodiment of varhour meter as is shown in FIGURE 3, but connected directly to the electrical supply system, without the intervention of instrument transformers.

FIGURE 4 is a schematic circuit diagram similar to FIGURES 1B, 2B and 3B, except that it discloses a 3-piece, 3-wire, "network" embodiment of my varhour meter, constructed as a socket meter provided with plug-in prongs for reception in a standard plug-in mounting socket.

FIGURE 5 is a vector diagram of a polyphase voltage system.

FIGURE 6 is a block summary showing meter response equations; and

FIGURE 6A is a composite diagram accompanying the above block summary showing the various polyphase systems.

Figure 2:
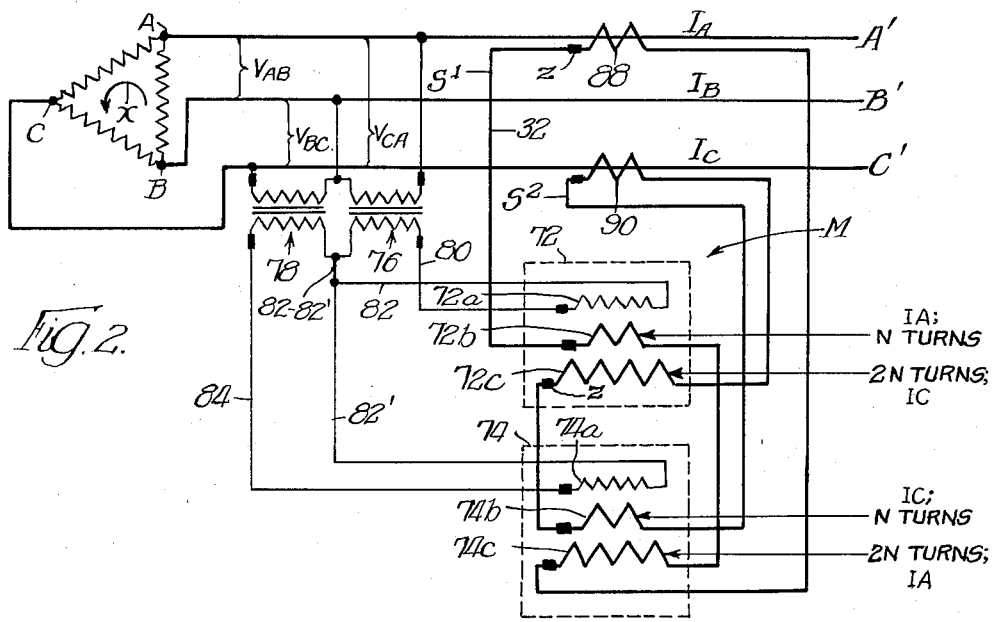
FIGURE 2 is a schematic circuit diagram of a 3-phase, 3-wire, delta-connected embodiment of my varhour meter, wherein the meter has voltage and current connections with the distribution system through instrument transformers.

My improved varhour meter is capable of measuring reactive power in various polyphase alternating current electrical systems operating at any desired frequency. For the purpose of illustration, four embodiments of my improved meter will be described with reference to four of the polyphase systems commonly encountered in distribution systems, namely (1) the 3-phase, 4-wire, Y-connected system, (2) the 3-phase, 3-wire, delta-connected system, (3) the 3-phase, 4-wire, delta-connected system, and (4) the 3-phase, 3-wire "network" system.

Referring to the first of these embodiments illustrated in FIGURES 1, 1A and 1B, the 3-phase, 4-wire system shown comprises the three Y-connected windings, A, B and C which connstitute the secondary windings of a conventional polyphase power transformer, and from the outer ends of which windings extend the three phase conductors A′, B′ and C′ transmitting polyphase currents to a load or loads. Extending from the central or neutral point N of these star-connected windings is the neutral conductor N′ which constitutes the fourth wire of this 4-wire system. Employing one conventional system of notation, the phase conductors A′, B′ and C′ carry respectively currents $I_A$, $I_B$ and $I_C$. The voltages between the phase and neutral conductors are indicated by the symbol V, followed by the letters of the conductors such as $V_{AN}$, $V_{CN}$, etc. A reversal of the letters in the subscript indicates a reversal in phase of the voltage represented thereby. The conventional counterclockwise rotation of the vectors representing the 3-phase voltages is assumed, as indicated by the circular arrow $x$ in FIGURE 1.

In its preferred embodiment, my improved reactive component or varhour meter M is of the general type utilizing two watt-responsive elements acting jointly on a single disk rotating system which is magnetically damped by a permanent magnet and is gear connected to a set of registering dials in any conventional manner. These two elements of the meter are indicated by the upper and lower dotted line rectangles 12 and 14. The upper or first element 12 comprises a voltage winding 12a and first, second and third current windings 12b, 12c and 12d. The lower or second element 14 similarly comprises a voltage winding 14a, and first, second and third current windings 14b, 14c and 14d.

The voltage winding 12a and the three current windings 12b, 12c and 12d of the upper element 12, operate when energized to establish a shifting magnetic field; and similarly, the voltage winding 14a and the three current windings 14b, 14c and 14d of the lower element 14 operate when energized to establish a second shifting magnetic field. As pointed out above, these two shifting magnetic fields are preferably arranged to act jointly on a single disk rotating system, although each magnetic field might be arranged to act singly or separately on two mechanically connected armatures or disks.

When the meter is to be employed on a distribution system A′, B′ and C′ carrying higher voltages and currents than can be connected directly to conventional meter windings, instrument transformers are preferably interposed. For example, a first voltage transformer 16 has its primary winding connected across conductors C′ and N′ for energization by the voltage $V_{CN}$, and a second voltage transformer 18 has its primary winding connected across conductors A′ and N′ for energization by the voltage $V_{AN}$. The secondary winding of potential transformer 16 is connected through conductors 20 and 22 with the voltage winding 12a of first element 12; and the secondary winding of the other potential transformer 18 is connected through conductors 22′ and 24 with the voltage winding 14a of the second element 14.

The current magnitudes are transmitted to the meter through three current transformers 26, 28 and 30, which have their primary windings in the three phase conductors A′, B′ and C′ respectively. In illustrating the connections between these secondary windings of the current transformers 26, 28 and 30 and the current windings of the meter, I have diagrammatically shown those windings which are wound in reverse or are reversely connected by transposing the connections between right and left ends of the windings. The small rectangular symbols z at one end of each transformer winding and each meter winding denote corresponding polarity at these ends of the windings.

The secondary winding of the first current transformer 26 is connected in series through the first current winding 14b of second meter element 14, and thence through the first current winding 12b of first meter element 12 through a first series circuit which I have designated as series circuit $S^1$. Tracing this series circuit $S^1$, it will be seen that it extends from the left hand end of current transformer 26 through conductor 32 to the right hand end of first current winding 14b of the second meter element 14. Thence, it continues from the left hand end of current winding 14b through conductor 34 to the right hand end of first current winding 12b of the first meter element 12; and from the left hand end of this latter winding it continues through conductor 36 on back to the right hand end of transformer secondary winding 26.

The secondary winding of the second current transformer 28 is connected in series through the second current winding 14c of the second meter element 14, and through the second current winding 12c of first element 12 through a second series circuit which I have designated series circuit $S^2$. Tracing this second series circuit $S^2$, it will be seen that it extends from the left hand end of current transformer 28 through conductor 38 to the right hand end of the second current winding 14c of the second element 14. Thence, it continues from the left hand end of this current winding 14c through conductor 40 to the left hand end of second current winding 12c of first element 12; and from the right hand end of this second current winding 12c it continues through conductor 42 on back to the right hand end of transformer secondary 28.

The secondary winding of the third current transformer 30 is connected in series through the third current winding 14d of the second meter element 14, and through the third current winding 12d of the first element 12 through a third series circuit which I have designated series circuit $S^3$. Tracing this third series circuit $S^3$, it will be seen that it extends from the left hand end of current transformer 30 through conductor 44 to the left hand end of the third current winding 14d of the second element 14. Thence, it continues from the right hand end of this current winding 14d through conductor 46 to the left hand end of the third current winding 12d of the first element 12; and from the right hand end of this third current winding 12d it continues through conductor 48 on back to the right hand end of transformer secondary 30.

Attention is directed to the fact that these three series circuits S¹, S² and S'³ have no electrical interconnection, but are completely isolated from each other, which is an important factor in adapting the meter to a "self-contained" type of installation, which will be later described in connection with FIGURE 1A.

As indicated in the drawing, a differential turn ratio exists between the current windings of the two elements 12 and 14. That is to say, the first current winding 12b of the first element 12 has substantially twice the number of turns as the second and third current windings 12c and 12d. The same is also true of the third current winding 14d of element 14 with respect to the first and second current windings 14b and 14c (exemplified in each case by sixteen and eight turns respectively, solely by way of illustration, in the case of a 2½ ampere varhour meter).

It will be seen from the foregoing that in the operation of the meter, the energization of first current transformer 26 from phase A of the 3-phase cycle will cause a current to flow through first series circuit S¹, passing in one direction through first current winding 14b of second element 14, and passing in the same direction through the first current winding 12b of first element 12 (which first current winding 12b has substantially twice the number of turns as its two associated current windings 12c and 12d). Similarly, the energization of second current transformer 28 from phase B of the three phase cycle will cause a current to flow through second series circuit S², passing in one direction through second current winding 14c of the second element 14, and passing in the opposite direction through the second current winding 12c of first element 12. Also, the energization of third current transformer 30 will cause a current to flow in one direction through third current winding 14d of second element 14 (having the 2N ratio of turns) and thence in the same direction through the third current-winding 12d of first element 12.

The above described relationship and connections of the meter windings and transformer windings are for a varhour meter intended to measure lagging reactive power. One prevalent prior method of obtaining varhour measurements has been to use a standard watthour meter, but with voltages 90 electrical degrees behind the corresponding voltages used for watthour measurement, these voltages being supplied by special autotransformers. In my invention I have combined the magnetic fields by proper choice of turns in current windings and method of connection to obtain the same meter registration while using voltages available in the system, the mathematical verification of which will be considered hereafter. It is assumed that the phase or line voltages will always remain substantially balanced. In modern distribution systems the unbalance of the phase voltages is usually quite small, so much so that errors resulting from this assumption are within acceptable limits. This varhour meter is theoretically correct for loads of unity power factor down to zero power factor, with lagging current. In order to prevent reverse registration of the varhour meter where not desired under the condition of leading current, the meter may be provided with a mechanical detent as is done to prevent registration of reversed power flow in watthour meters. These varhour meters may be used for measurement of varhours under the condition of leading current, by reversing the connections of the potential windings on both elements.

As will now be described in connection with FIGURE 1A, the above described embodiment of varhour meter possesses the advantages of the so-called "self-contained" type of integrating meter, i.e. wherein the potential transformers 16 and 18 can be dispensed with, and the current transformers 26, 28 and 30 can also be dispensed with, and the windings of the meter can be connected directly to the 3-phase conductors A', B' and C'. It will be understood that this "self-contained" type of operation is only practicable where the line voltages and the load currents are within the working ranges of the usual or conventional design of meter to be employed.

FIGURE 1A shows this same embodiment of meter operating in such "self-contained" type of installation. The potential responsive conductors 20, 22, 22' and 24 connect to the phase and neutral conductors in direct connections, instead of through the current transformer 26, this first series circuit continuing on through the first current winding 14b of second element 14, and also in the same direction through the first current winding 12b of first element 12, the same as previously described. Likewise, the second series circuit S² is interposed directly in phase conductor B', instead of through the current transformer 28, this second series circuit continuing on through the second current winding 14c of second element 14, and then in the opposite direction through second current winding 12c of the first element 12, the same as above described. The third series circuit S³ is interposed directly in phase conductor C' and passes seriatim in the same direction through the two third current windings 14a and 12d of elements 14 and 12. This "self-contained" embodiment of meter illustrated in FIGURE 1A operates in the same manner and with the same degree of accuracy as the transformer connected embodiment disclosed in FIGURE 1.

In FIGURE 1B I have shown how the above described construction of varhour meter can be provided with conventional plug-in terminal prongs for plug-in reception into the conventional spring jaw or female receiving terminals of a standard socket receptacle of the type that ordinarily receives the conventional plug-in type of watthour meter.

The standard mounting socket for receiving a plug-in type of watthour meter is usually of circular formation, as indicated at 46 in FIGURE 1B. When the socket is adapted to receive a watthour meter for a 3-phase, 4-wire system, comparable to that shown in FIGURE 1, the socket is provided with an upper horizontal row of three prong receiving socket terminals 52, 54 and 56, and is also provided with a lower horizontal row of three prong receiving socket terminals 58, 60 and 62, both of these upper and lower rows serving to establish current connections. Between these upper and lower rows is an intermediate row including socket terminals 64, 66, 68 and 70 for establishing voltage connections. The upper socket terminals 52, 54 and 56 in the socket base 46 are adapted to receive matching terminal prongs 52', 54', and 56' projecting rearwardly from the back of the varhour meter M, and the lower socket terminals 58, 60 and 62 in the socket base are adapted to receive matching terminal prongs 58', 60' and 62' also projecting rearwardly from the back of the varhour meter. Likewise, the intermediate socket terminals 64, 66, 68 and 70 are adapted to receive matching terminal prongs. In FIGURE 1B I have shown the current transformers 26, 28 and 30 in the circuit but have omitted the voltage transformers 16 and 18, such illustrating an alternate arrangement to that disclosed in FIGURE 1A. In this alternate arrangement, the voltage conductors 20, 22—22' and 24 extend directly from the phase conductor C', neutral conductor N' and phase conductor A' to the socket terminals 66, 68—70 and 64. The cooperating prong terminals 66', 68'—70' and 64' are connected with the two potential windings 12a and 14a of the two meter elements 12 and 14, corresponding to FIGURES 1 and 1A.

Referring now to the current windings of the meter, the current transformer 26 of phase conductor A' connects through the first series circuit S¹ with the socket terminals 52 and 58 of the socket base, which in turn connect by way of the cooperating prong terminals 52' and 58' on the meter M with the current winding 14b of the meter element 14 and with the current winding 12b of the meter element 12. Similarly, the second current transformer 28 of phase conductor B' connects through the second series circuit S² with the socket terminals 54 and 60 of the socket base, which in turn connect by way of the cooperating prong terminals 54' and 60' on the meter with the current winding 14c of the meter element 14 and with the current winding 12c of the meter element 12. In like manner, the third current transformer 30 of phase conductor C' connects through the third series circuit S³ with the socket terminals 56 and 62, and in turn through the cooperating prong terminals 56' and 62' with the current winding 14d of meter element 14 and with the current winding 12d of meter element 12, all corresponding to FIGURES 1 and 1A. Thus, my improved varhour meter M can be mounted interchangeably with a conventional watthour meter in a standard socket base such as the socket base 46.

DERIVATION OF THE INTERNAL CONNECTIONS FOR FOUR-WIRE Y METERS

The derivation of the internal connections required for the three phase four-wire Y varhour meter of FIGS. 1, 1A to measure wattless energy is as follows:

The standard watthour meter for this circuit has a torque proportional to $$P = V_{AN} \cdot [I_A - I_B] + V_{CN} \cdot [I_C - I_B] \quad \text{(Equation 1)}$$

where $V_{AN} \cdot I_A$ is the power in Phase A
$V_{CN} \cdot I_C$ is the power in Phase C
$(V_{AN} + V_{CN}) \cdot (-I_B)$ is the power in phase B.

To provide the varhour meter, lagging quadrature voltages are now substituted in place of voltages $V_{AN}$ and $V_{CN}$. That is, voltages $V_{BC}$ and $V_{AB}$ are the proper quadrature voltages for $V_{AN}$ and $V_{CN}$ respectively. The magnitude of these voltages is $\sqrt{3}$ times the magnitude of $V_{AN}$ and $V_{CN}$; consequently, a varmeter with these voltages would indicate $\sqrt{3}$ vars or $$\sqrt{3} \text{ vars} = V_{BC} \cdot [I_A - I_B] + V_{AB} \cdot [I_C - I_B]$$

It is desirable to obtain the equivalent of $V_{BC}$ and $V_{AB}$ by using normal watthour phase voltage. This would greatly simplify the installation by using the same transformers and connections as used on the watthour meter.

It can be seen that $$V_{BC} = V_{BN} + V_{NC}$$

and $$V_{AB} = V_{AN} + V_{NB}$$

therefore $$\sqrt{3} \text{ vars} = [V_{BN} + V_{NC}] \cdot [I_A - I_B] + [V_{AN} + V_{NB}] \cdot [I_C - I_B]$$

However, the actual watthour meter voltages available are $V_{AN}$ and $V_{CN}$.

Then $$V_{BN} = -V_{CN} - V_{AN}$$

or $$V_{NB} = V_{CN} + V_{AN}$$

and substituting $$\sqrt{3} \text{ vars} = [-2V_{CN} - V_{AN}] \cdot [I_A - I_B] + [2V_{AN} + V_{CN}] \cdot [I_C - I_B]$$

collecting terms to provide

Equation (2)

$$\sqrt{3} \text{ vars} = V_{AN} \cdot [-I_A - I_B + 2I_C] + V_{CN} \cdot [-2I_A + I_B + I_C]$$

From the above it can be seen that by using voltages $V_{CN}$ and $V_{AN}$ which are normally available on a watthour meter, we only need to have the following current coils on their respective stators.

| | |
|---|---|
| $-2I_A$ | Twice the turns of either $I_B$ or $I_C$ and wound in reverse. |
| $V_{CN}$: | |
| $I_B$ | Normal coil. |
| $I_C$ | Do. |
| $V_{AN}$: | |
| $-I_A$ | Reversed coil. |
| $-I_B$ | Do. |
| $+2I_C$ | Twice the turns of either $-I_A$ or $-I_B$. |

The novel order of such construction has been set forth in FIGS. 1, 1A and as there shown the meter is constant with the derivation set forth hereat.

Referring now to FIGURE 2, this illustrates another embodiment of my invention adapted for a 3-phase, 3-wire, delta-connected distribution system. This comprises the three delta-connected windings A, B and C, which constitute the secondary windings of a conventional polyphase power transformer, and from the terminals of which windings extend the phase conductors A', B' and C'. The pertinent voltages between the three conductors are indicated, such as $V_{AB}$, $V_{BC}$, $V_{CA}$, etc.

This embodiment of meter has the same relation of first and second meter elements 72 and 74, comparable to the previously described meter elements 12 and 14, each having individual voltage windings 72a and 74a. However, in this instance, each of the meter elements 72 and 74 has only two current windings, as will be later described.

Substantially the same relation of potential transformers 76 and 78 have their secondary windings connected through conductors 80, 82, 82' and 84 with the voltage windings 72a and 74a of the first and second meter elements 72 and 74, as previously described. However, in this instance the primary winding of potential transformer 76 is connected across phase conductors A' and B' for energization by the voltage $V_{AB}$, and the primary winding of potential transformer 78 is connected across conductors B' and C' for energization by the voltage $V_{BC}$.

In this embodiment, there are two current transformers 88 and 90 which have their primary windings in the two phase conductors A' and C' respectively, and which have their secondary windings energizing the two electrically isolated series circuits S¹ and S² for the two sets of current windings in each of the two meter elements 72 and 74. In the first meter element 72 these two current windings are designated 72b and 72c; and in the second meter element 74 they are designated 74b and 74c. In the first meter element 72, the second current winding 72c has twice the number of turns as the first current winding 72b; and in the second meter element 74 the second current winding 74c likewise has twice the number of turns as the first winding 74b.

The first series circuit S¹, responsive to current flow in phase conductor A', passes from left to right through first current winding 72b of first meter element 72, and thence passes in the reverse direction from right to left through second current winding 74c of second meter element 74 and on to current transformer 88.

The second series circuit S², responsive to current flow in phase conductor C', passes from right to left through first current winding 74b of second meter element 74, following which it passes from left to right through second current winding 72c of first meter element 72, and thence back to current transformer 90.

The sequence, direction, and intensity of flux flow through the core structures of these first and second meter elements 72 and 74, in response to the cyclical phase energization of the several meter windings, will be understood from the foregoing. The above described relationship of the meter windings in the two meter elements operates to combine magnetic fluxes within the meter elements to effect the desired reactive component registration on a varhour basis, as previously described.

Figure 2A:
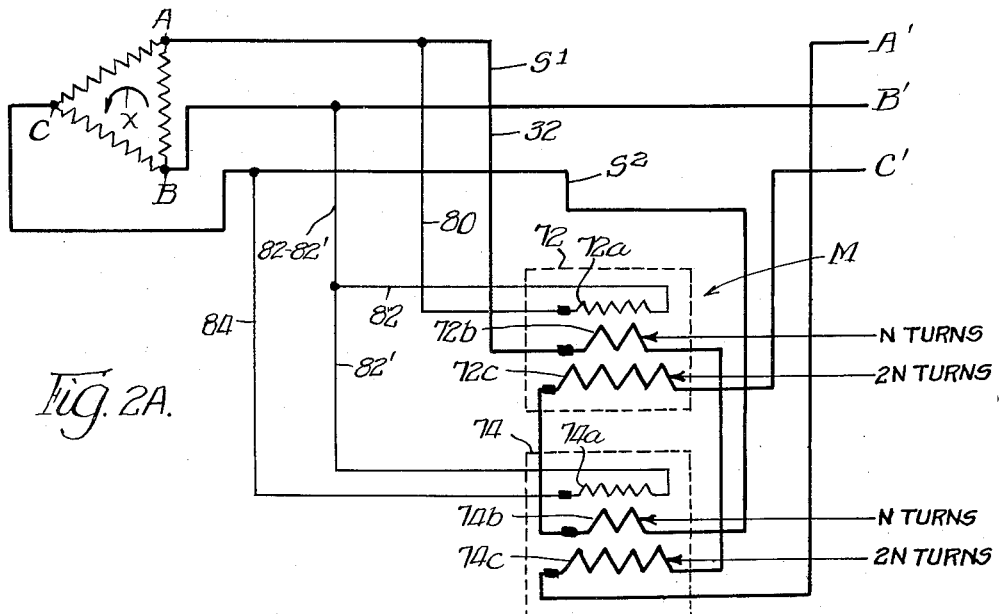
FIGURE 2A is a similar circuit diagram showing the same embodiment of varhour meter as is shown in FIGURE 2, but connected directly to the distribution system, without the intervention of instrument transformers.

Here again, inasmuch as my improved construction does not operate upon the theory of combining currents vectorily within any of the individual meter windings, it is possible to have the two series circuits $S^1$ and $S^2$ electrically isolated from each other. By virtue thereof, it is also possible to construct or connect this latter embodiment in the form of a self-contained type of meter, for use in installations where the line voltages and load currents are within the practical working ranges of the meter. Such a self-contained adaptation is illustrated in FIGURE 2A, which is quite similar to FIGURE 1A. The potential and current transformers are both shown as being dispensed with, and the direct connection of the voltage and current meter windings with the phase conductors A', B and C' will be clearly apparent from the preceding description of FIGURE 2 and also of FIGURE 1A.

Figure 2B:
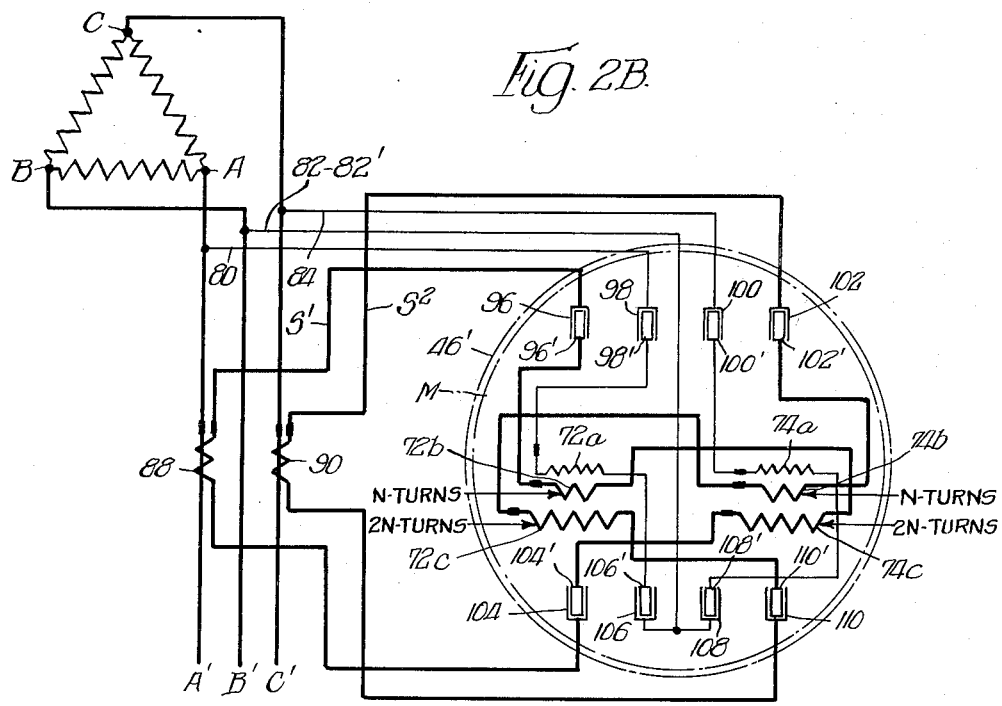
FIGURE 2B is another schematic view similar to FIGURE 1B, showing the embodiment of varhour meter disclosed in FIGURE 2, constructed as a socket meter provided with a similar arrangement of plug-in prongs for reception in a standard plug-in mounting socket.

FIGURE 2B illustrates the above 3-phase, 3-wire, delta-connected varhour meter constructed in the form of a socket meter adapted for plug-in reception into a standard socket for receiving a watthour meter of the conventional 3-phase, 3-wire, delta-connected socket type. The mounting socket 46' has four upper spring-jaw terminals 96, 98, 100 and 102, and four lower spring-jaw terminals 104, 106, 108 and 110. The potential conductors 80, 82 and 84, which in this instance are shown as being connected directly to phase conductors A', B' and C', have their other ends connected to socket terminals 98, 106–108 and 100. The meter prongs 98' and 106' connect meter voltage winding 72a in circuit to respond to voltage $V_{AB}$. The meter prongs 100' and 108' connect the other meter voltage winding 74a in circuit to respond to voltage $V_{BC}$.

Referring now to the current circuits, series circuit $S^1$ connects to socket terminals 96 and 104, and series circuit $S^2$ connects to socket terminals 102 and 110. The meter prongs which are receivable in these socket terminals complete the series circuits through the current windings 72b and 74c, and through the other current windings 74b and 72c in the same relationship illustrated and described in connection with FIGURES 2 and 2A.

DERIVATION OF THE INTERNAL CONNECTIONS FOR DELTA-CONNECTED, 3-PHASE, 3-WIRE METERS

The derivation of the internal connections for the 3-phase, 3-wire service is obtained by substituting a combination of line voltages $V_{AB}$ and $V_{CB}$ in place of phase voltages $V_{AN}$ and $V_{BN}$ and by substituting $-I_A - I_C$ in place of current $+I_B$.

Consider the following:

$$V_{AB} = V_{AN} + V_{NB}$$

but $$V_{AN} + V_{BN} + V_{CN} = 0 \text{ or } V_{NB} = V_{AN} + V_{CN}$$

therefore $$V_{AB} = V_{AN} + V_{AN} + V_{CN}$$

Also $$V_{AC} = V_{AN} + V_{NC} \text{ or } V_{CN} = V_{AN} + V_{CA}$$

therefore $$V_{AB} = 2V_{AN} + V_{AN} + V_{CA}$$

and $$V_{AB} + V_{BC} + V_{CA} = 0 \text{ or } V_{CA} = -V_{AB} - V_{BC}$$

therefore $$2V_{AB} = 3V_{AN} - V_{BC}$$

To rewrite:

$$V_{AN} = \frac{2V_{AB} + V_{BC}}{3}$$

By similar solution:

$$V_{CN} = \frac{2V_{CB} + V_{BA}}{3}$$

Also, as mentioned, the substitution $$I_B = -I_A - I_C$$

for 3-wire, 3-phase can be made.

The results of these substitutions in Equation 2 (column 7), which was developed for the 4-wire Y Meter heretofore, will be $$\sqrt{3} \text{ vars} = \frac{2V_{AB} + V_{BC}}{3} \cdot (3I_C) + \frac{2V_{CB} + V_{BA}}{3} \cdot (-3I_A)$$

$$\sqrt{3} \text{ vars} = 2V_{AB} \cdot I_C + V_{AB} I_A - V_{CB} \cdot I_C - 2V_{CB} I_A$$
$$= V_{AB} \cdot (2I_C + I_A) + V_{CB} \cdot (-I_C - 2I_A)$$

It will be apparent that the structure and connections of the 3-phase, 3-wire meter set forth in FIGURES 2 and 2A is consistent with the teaching of the derivation.

Referring now to FIGURE 3, this illustrates another embodiment of my invention adapted for a 3-phase, 4-wire, delta-connected distribution system. This comprises the three delta-connected windings A, B and C, which constitute the secondary windings of a conventional polyphase power transformer for transmitting polyphase currents to a load or loads over the 3-phase conductors A', B' and C', the same as above described. Extending from the mid-point or neutral point N of one of these secondary windings (such as the mid-point of phase winding A—B) is the neutral conductor N which constitutes the fourth wire of this 4-wire system. In this embodiment the potential transformers 76 and 78 have their primaries connected to respond to voltages $V_{AC}$ and $V_{AB}$ respectively, and have their secondaries connected to the potential windings of the meter elements, by way of conductors 80, 82, 82' and 84, as illustrated in FIGURE 3. In this embodiment, the first and second meter elements are designated 112 and 114, having potential windings 112a and 114a, respectively. The upper or first element 112 has two current windings 112b and 112c, both having an equal number of turns (N turns). The lower or second element 114 has three current windings 114b, 114c and 114a. The first of these windings 114b has a ratio of 3/2 N turns with respect to the N turns of current windings 112b and 112c. The second and third of these windings 114c and 114a both have a ratio of N/2 turns with respect to the N turns of current windings 112b and 112c.

Three current transformers 126, 128 and 130 respond to the currents in the three phase conductors A', B' and C', and energize the three series circuits $S^1$, $S^2$ and $S^3$ respectively. Series circuit $S^1$ passes from left to right through current winding 112b, and thence passes from right to left through current winding 114d. Series circuit $S^2$ passes from right to left through current winding 112c, and thence passes from left to right through current winding 114c. Series circuit $S^3$ passes from left to right only through current winding 114b. Here, again all three series circuits $S^1$, $S^2$ and $S^3$ are shown as being electrically isolated from each other. The phase relationship of energization of these five current windings and the ratio of the flux densities produced thereby will be understood from the descriptions of the preceding embodiments and this embodiment.

FIGURE 3A shows the above 4-wire, delta-connected embodiment converted into a "self-contained" type of varhour meter in which the instrument transformers have been dispensed with. The potential circuits will be obvious from the preceding description of FIGURE 3. Likewise, the series circuits $S^1$, $S^2$ and $S^3$ responding to current flow will also be understood from the preceding description.

Figure 3B:
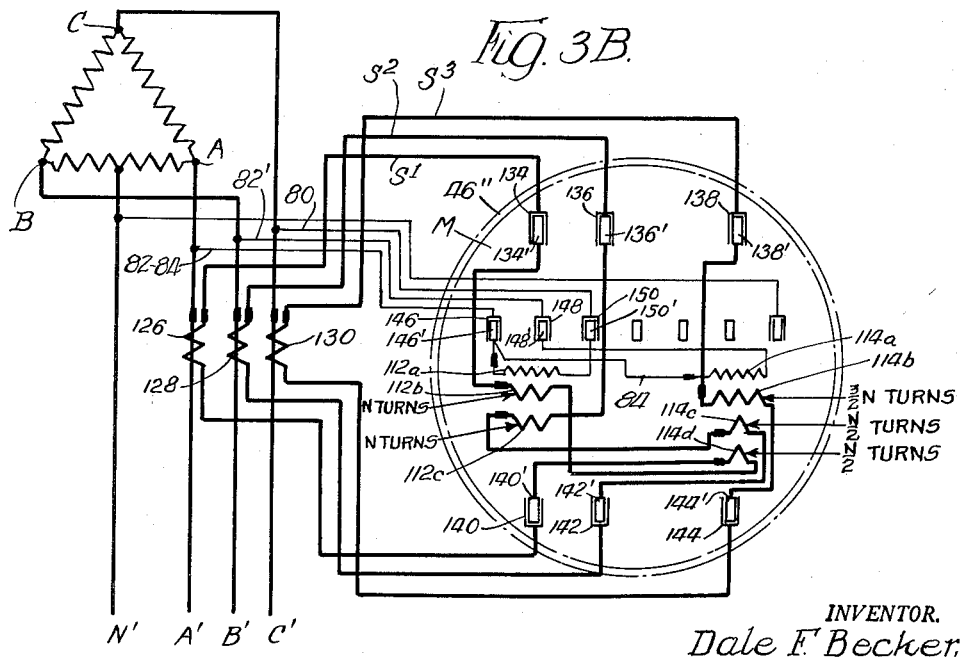
FIGURE 3B is another schematic view, similar to FIGURES 1B and 2B, showing the latter embodiment of varhour meter disclosed in FIGURE 3, likewise constructed as a socket meter provided with plug-in prongs for reception in a standard mounting socket.

FIGURE 3B shows this 3-phase, 4-wire, delta-connected varhour meter M constructed as a socket embodiment adapted for plug-in reception in a mounting socket 46", corresponding substantially to the socket embodiments of FIGURES 1B and 2B. In this embodiment, the socket has three upper socket terminals 134, 136 and 138, three lower socket terminals 140, 142 and 144 and three intermediate socket terminals 146, 148 and 150. The potential conductors 82 and 80 extend from phase conductors A' and C' to socket terminals 146, and 150, from whence meter prongs 146' and 150' conduct the voltage $V_{AC}$ to the voltage winding 112a of meter element 112. The potential conductors 82 and 82' conduct voltage $V_{AB}$ from phase conductors A' and B' through socket terminals 146, 148 and meter prongs 146', 148' to the other voltage winding 114a.

In the current connections, series circuit $S^1$ connects through socket terminals 134, 140 and meter prongs 134', 140' with the current windings 112b and 114d. Series circuit $S^2$ connects through socket terminals 136, 142 and meter prongs 136', 142' with the current windings 112c and 114c. Series circuit $S^3$ connects through socket terminals 138, 144 and meter prongs 138', 144' with the single current winding 114b of meter element 114. The derivation of the internal connections of this 4-wire delta-connected meter of FIGURES 3, 3A and 3B will be better understood from the following:

DERIVATION OF THE INTERNAL CONNECTIONS FOR FOUR-WIRE DELTA METERS

The derivation of the internal connections for a 3-phase, 4-wire, delta varhour meter to measure wattless energy is as follows:

$$\text{Watts} = V_{AB} \cdot \frac{(I_A - I_B)}{2} + V_{CN} \cdot I_C$$

$$\text{Vars} = -jV_{AB} \cdot \frac{(I_A - I_B)}{2} - jV_{CN} \cdot I_C$$

however $$-jV_{AB} = \frac{2}{\sqrt{3}} V_{NC}$$

and $$V_{NC} = V_{NA} + V_{AC}$$

also $$V_{NA} = \frac{V_{BA}}{2}$$

$$V_{NC} = \frac{V_{BA}}{2} + V_{AC}$$

and $$-jV_{AB} = \frac{2}{\sqrt{3}} \left( \frac{V_{BA}}{2} + V_{AC} \right) = \frac{V_{BA} + 2V_{AC}}{\sqrt{3}}$$

thus $$-jV_{AB} = \frac{2V_{AC} + V_{BA}}{\sqrt{3}}$$

and $$-jV_{CN} = \frac{\sqrt{3}}{2} V_{AB}$$

$$\text{Vars} = \frac{(2V_{AC} + V_{BA})}{\sqrt{3}} \cdot \frac{(I_A - I_B)}{2} + \frac{3}{2} V_{AB} \cdot I_C$$

$$\sqrt{3} \text{ Vars} = (2V_{AC} - V_{AB}) \cdot \frac{(I_A - I_B)}{2} + \frac{3}{2} V_{AB} \cdot I_C$$

$$\sqrt{3} \text{ Vars} = V_{AC} \cdot (I_A - I_B) + V_{AB} \cdot \frac{(I_B - I_A + 3I_C)}{2}$$

It will be apparent that the structure and connections of the varhour meter of FIGURES 3, 3A are consistent with such derivation.

In FIGURE 4 I have illustrated another embodiment of my improved varhour meter adapted for measuring the reactive power on a so-called "network" type of system consisting of a 3-phase, 3-wire service as supplied from the neutral conductor and two phase conductors of a Y-connected, 3-phase, 4-wire source. This source comprises the three Y-connected secondary windings A, B and C of a polyphase power transformer, these secondary windings having a neutral point N. The 3-wire service illustrated in FIGURE 4 is derived from phase conductors $A^1$ and $C^1$ and neutral conductor $N^1$. The secondary winding B is not connected to this 3-wire service, but instead is connected to a second customer's 3-wire service, which likewise includes two phases (such as B and A) and the neutral connection N. A third customer's 3-wire service can also radiate from this same source, such as phases B and C and the neutral connection. My varhour meter can be connected in any of these three service systems. In the service system illustrated, the two elements of the meter are designated 152 and 154, each having a voltage winding and two current windings, designated 152a, 152b, 152c, and 154a 154b, 154c respectively. The two current windings 152c and 154c have twice as many turns as their companion current windings 152b and 154b.

This embodiment is shown as being of the socket mounted type, wherein the socket is also adapted for the reception of a standard watthour meter, but it may have any other type of base connection desired. This socket 46''' has four upper socket terminals 158, 160, 162 and 164, and four lower socket terminals 166, 168, 170 and 172, each adapted to receive their respective meter prongs 158'—172'.

Three voltage conductors 176, 178 and 180, extend from phase conductors A', C' and neutral conductor N' respectively; conductor 178 connecting to socket terminal 158, conductor 178 connecting to socket terminal 162, and conductor 180 connecting jointly to socket terminals 168 and 170. Thus, it will be seen that voltage winding 152a is energized by voltage $V_{AN}$ from conductors A' and N'; and that voltage winding 154a is energized by voltage $V_{CN}$ from conductors C' and N'.

Two current transformers 184 and 186 respond to the currents in phase conductors A' and C', and energize series circuits $S^1$ and $S^2$ respectively. Series circuit $S^1$ connects with socket terminals 158 and 166, and thus it passes through current windings 154c and 152b, both from right to left. Series circuit $S^2$ connects with socket terminals 164 and 172, and thus it passes through current windings 152c and 154b, both from left to right. The phase energization and flux densities will be understood from the preceding embodiments. This embodiment may also be of the completely self-contained type having no instrument transformers whatever, or it may be of the all-transformer type having potential transformers in addition to the current transformers shown.

*General Discussion*

It is a well known fact that any watthour meter will measure varhours if the potential coils are connected to suitable voltages that are the same magnitude of those employed for the watthour connection, but lagging them by 90 degrees.

It is also possible to construct a volt ampere-hour meter that will operate satisfactorily over a limited range of power factor by providing a voltage θ degrees behind the voltage that the potential coil is normally connected to for watthour meter operation. Such a meter will be exactly correct at only one power factor, but actually the meter is reasonably correct over a rather large range of power factors.

The purpose of the following development is to artificially construct from the watthour meter voltages available, fictitious voltages that lag the watthour meter voltages by an angle θ. While it is not possible in reality to obtain such lagging voltages easily, it can be shown that it is possible to group terms in such a way as to use only voltages that are really available, in the final expression. Consider the vector diagram shown in FIGURE 5 where $K_1$ and $K_2$ are real numbers, and the artificially constructed voltages $$(K_1 V_{AN} + K_2 V_{CN}) \text{ and } (K_2 V_{AN} + K_1 V_{BN})$$

are of the same magnitude as the phase voltages.

Our normal watthour meter voltages are $V_{AN}$ and $V_{CN}$, so we wish to provide the artificial voltages lagging by $\theta$ degrees.

This means that we should substitute in place of $V_{AN}$ (Equation 1, col. 7) that voltage which lags $V_{AN}$ by $\theta$ degrees $(K_1 V_{BN} + K_2 V_{AN})$. Also, in place of $V_{CN}$ we should substitute in Equation 1 the voltage lagging $V_{CN}$ by $\theta$ degrees $(K_1 V_{AN} + K_2 V_{CN})$. The result of this substitution is:

$$X = (K_1 V_{BN} + K_2 V_{AN}) \cdot (I_A - I_B) + (K_1 V_{AN} + K_2 V_{CN}) \cdot (I_C - I_B)$$

Where X is what the meter will indicate. The voltage $V_{BN}$ is not available, since we intend to use the same potential and current transformers as would ordinarily be used for watthour measurement.

The equivalent of $V_{BN}$ is $$-(V_{AN} + V_{CN})$$

Substituting:

$$X = [K_2 V_{AN} - K_1(V_{AN} + V_{CN})] \cdot (I_A - I_B) + (K_1 V_{AN} + K_2 V_{CN}) \cdot (I_C - I_B) =$$
$$(V_{AN}(K_2 - K_1) - K_1 V_{CN}) \cdot (I_A - I_B) + (K_1 V_{AN} + K_2 V_{CN}) \cdot (I_C - I_B)$$

To simplify:

$$X = V_{AN} \cdot V_{AN} \cdot (K_2 - K_1) I_A - V_{AN} \cdot (K_2 - K_1) I_B - V_{CN} \cdot K_1 I_A + V_{CN} K_1 I_B + V_{AN} \cdot K_1 I_C$$
$$- V_{AN} \cdot K_1 I_B + V_{CN} \cdot K_2 I_C - V_{CN} \cdot K_2 I_B$$

$$(4)\ X = V_{AN} \cdot [(K_2 - K_1) I_A - K_2 I_B + K_1 I_C] + V_{CN} \cdot [-K_1 I_A + (K_1 - K_2) I_B + K_2 I_C]$$

The last expression (4) has grouped $K_1$ and $K_2$ as plus and minus factors that multiply currents. This can be accomplished as a practical matter with the relationship between the number of turns in the individual current coils, and their direction of winding.

The purpose of the following development is to obtain $K_1$ and $K_2$ as a function of angle $\theta$. The nature of the development is also such that it fixes the magnitude of the fictitious voltage such that their magnitude is equal to the magnitude of the phase voltages. In other words, the fictitious voltages are of constant magnitude but rotated through angle $\theta$.

Consider the vector diagram (3), shown in FIGURE 5:

$$V_{CN}(e^{-j\theta}) = K_1 V_{AN} + K_2 V_{CN}$$

The operator, $e^{-j\theta}$ rotates $V_{CN}$ through the angle $\theta$ such that it falls directly on top of and equals $$(K_1 V_{AN} + K_2 V_{CN})$$

Also $$V_{AN} = V_{CN} \cdot e^{-j\theta} 120$$

Therefore:

$$V_{CN} e^{-j\theta} = K_1 V_{CN} e^{-j120} + K_2 V_{CN}$$

or $$e^{-j\theta} = K_1 e^{-j120} + K_2$$

but $$e^{-j\theta} = \cos \theta - j \sin \theta$$

and $$e^{-j120} = \cos 120 - j \sin 120$$

Therefore:

$$\cos \theta - j \sin \theta = K_1 \cos 120 - K_1 j \sin 120 + K_2$$

substituting for $$\cos 120 = -\frac{1}{2} \text{ and } \sin 120 = \frac{\sqrt{3}}{2}$$

$$\cos \theta - j \sin \theta = \frac{-K_1}{2} - j K_1 \frac{\sqrt{3}}{2} + K_2$$

Equating the reals:

$$K_2 = \cos \theta + \frac{K_1}{2}$$

Equating the imaginaries:

$$K_1 = \frac{2}{\sqrt{3}} \sin \theta$$

By way of brief summary, the basic equations for the foregoing embodiments of the varhour meter are as follows:

3-PHASE FOUR-WIRE Y $$X = V_{AN} \cdot [(K_2 - K_1) I_A - K_2 I_B + K_1 I_C] + V_{CN} \cdot [-K_1 I_A + (K_1 - K_2) I_B + K_2 I_C]$$

3-WIRE-3-PHASE $$X = V_{AB} \cdot [K_2 I_A + K_1 I_C] + V_{CB} \cdot [-K_1 I_A + (K_2 - K_1) I_C]$$

3-PHASE FOUR-WIRE DELTA $$X = V_{AB} \cdot \left[ (K_2 - K_1) \frac{(I_A - I_B)}{2} + (K_2 + K_1) \frac{I_C}{2} \right]$$
$$+ V_{AC} \cdot \left[ \frac{K_1(I_A - I_B)}{2} + (K_1 - 2K_2) \frac{I_C}{2} \right]$$

3-WIRE NETWORK $$X = V_{AN} \cdot [(K_2 - K_1) I_A + K_1 I_C] + V_{CN} \cdot [-K_1 I_A + K_2 I_C]$$

As indicated heretofore, the novel concepts of the disclosure may also be used to provide new and novel volt ampere hour meter as well as the novel varhour meters set forth above, and the advantages of lower initial cost, reduced installation size, ease in testing and simplicity of connection are also exhibited therein.

With reference, to the foregoing basic equations, it will be apparent that the connections for a 0°, 30°, 60° and 90° meter of each of the four species represented by the four basic equations may be provided by substituting the corresponding $\theta + K_1$, $K_2$ and the basic equation. Briefly in solving for 30° meters, $\theta = 30°$ $$K_1 = \frac{2}{\sqrt{3}} \sin 30 = \frac{1}{\sqrt{3}}$$

$$K_2 = \cos 30° + \frac{1}{2\sqrt{3}} = \frac{2}{\sqrt{3}}$$

60° meters, $\theta = 60°$ $$K_1 = \frac{2}{\sqrt{3}} \sin 60 = 1$$

$$K_2 = \cos 60 + \frac{1}{2} = 1$$

90° meters, $\theta = 90°$ $$K_1 = \frac{2}{\sqrt{3}} \sin 90 = \frac{2}{\sqrt{3}}$$

$$K_2 = \cos 90 + \frac{2}{2\sqrt{3}} = \frac{1}{\sqrt{3}}$$

The connections for the various meter types as derived in such manner are set forth in the block summary shown in FIGURES 6 and 6A of the drawings By way of brief explanation of the teaching of the foregoing summary, reference is made to the above equations for the 60° volt ampere hour meter for a three phase four wire unit. It will be apparent that such equation may be written as $$X = V_{NA} \cdot [I_B - I_C] + V_{NC} \cdot [I_A - I_C]$$

which, translated to structure, means that the components of a normal watt hour meter may be connected as a 60° VA meter without recalibration by merely reversing the polarity of both potential coils, coupling current B through terminals A, coupling current C through terminals B, coupling terminal A through terminal C.

In a similar manner, the varhour meter of FIGURES 1 and 1a may be modified as indicated by the formula for the 30° VA meter and specifically by reversing the polarity of both potential coils, coupling current C through terminals A, coupling current A over terminals B and coupling current B over terminal C.

Thus a simple modification of the external socket connections of a varhour meter will provide 30° VA meter which does not need recalibration. The structure of the other meters set forth by the teaching of the block summary and the manner in which meters having different θ values (such as 45° etc.) will be obvious from such teaching.

While I have illustrated and described what I regard to be the preferred embodiments of my invention, nevertheless it will be understood that such are merely exemplary and that numerous modifications and rearrangements may be made therein without departing from the scope of the invention.

I claim:

1. In combination with a three phase, four-wire Y connected alternating current system having three phase-conductors identified in the order of conventional phase rotation A, B, C carrying currents $I_A$, $I_B$, $I_C$ and a neutral conductor N carrying a current $I_N$, said system having a voltage $V_{AN}$ between the phase-conductor A and the neutral conductor N and a voltage $V_{CN}$ between phase-conductor C and neutral conductor N, a device for measuring a reactive component of the system comprising a multi-element meter having a first and a second watt-responsive element, each of said elements including at least one voltage winding and a plurality of current windings IA, IB and IC means connecting the voltage winding of the first of said elements to the system to develop a flux from the voltage $V_{AN}$, means for connecting the current windings of said first element to the system to develop a flux in accordance with the expression $[-I_A-I_B+2I_C]$, means for connecting the voltage winding of the second of said elements to the system to develop a flux from the voltage $V_{CN}$, means for connecting the current windings of said second element to the system to develop a flux in accordance with the expression $[-2I_A+I_B+I_C]$, and a common indicating means mounted for displacement by the fluxes developed by said first and second elements to provide a meter response proportional to the expression $V_{AN} \cdot [-I_A-I_B+2I_C] + V_{CN} \cdot [-2I_A+I_B+I_C]$, the digits in each of said expressions representing the relative number of turns of the current windings and the algebraic signs representing the relative polarity of energization.

2. In combination with a three-wire, three-phase, delta-connected alternating current system having three phase-conductors identified in the order of conventional phase rotation A, B, C, carrying currents $I_A$, $I_B$, $I_C$, said system having voltages $V_{AB}$ and $V_{CB}$ between the phase-conductors A and B and C and B respectively, a device for measuring a reactive component of the system comprising a multi-element meter having a first and a second watt-responsive element, each of said elements including at least one voltage winding and a plurality of current windings IA and IC means connecting the voltage winding of the first of said elements to the system to develop a flux in accordance with the expression $V_{AB}$, means for connecting the current windings of said first element to the system to develop a flux in accordance with the expression $[I_A+2I_C]$, means for connecting the voltage winding of the second of said elements to the system to develop a flux in accordance with the expression $V_{CB}$, means for connecting the current windings of said second element to the system to develop a flux in accordance with the expression $[-2I_A-I_C]$, and a common indicating means mounted for displacement by the fluxes developed by said first and second elements to provide a meter response proportional to the expression $V_{AB} \cdot [I_A+2I_C] + V_{CB} \cdot [-2I_A-I_C]$, the digits in each of said expressions representing the relative number of turns of the current windings and the algebraic signs representing the relative polarity of energization.

3. In combination with a three-phase, four-wire delta connected alternating-current system having three phase-conductors arranged in the order of conventional phase rotation A, B, C carrying currents $I_A$, $I_B$, $I_C$ and a neutral conductor carrying a current $I_N$, said system having voltages $V_{AB}$ and $V_{AC}$ between the phase-conductors A, B and A, C respectively, device for measuring a reactive component of the system comprising a multi-element meter having a first and a second watt-responsive element, the first of said elements including at least one voltage winding and a plurality of current windings IA, IB and IC, and the second of said elements including at least one voltage winding and a plurality of current windings $I_A$ and $I_B$, means connecting the voltage winding of the first of said elements to the system to develop a flux in accordance with the expression $V_{AB}$, means for connecting the current windings of said first element to the system to develop a flux in accordance with the expression $$\left[ \frac{I_B - I_A + 3I_C}{2} \right]$$

means for connecting the voltage winding of the second of said elements to the system to develop a flux in accordance with the expression $V_{AC}$, means for connecting the current windings of said second element to the system to develop a flux in accordance with the expression $[I_A-I_B]$, and a common indicating means mounted for displacement by the fluxes developed by said first and second elements to provide a meter response proportional to the expression $$V_{AB} \cdot \left[ \frac{I_B - I_A}{2} + \frac{3}{2} I_C \right] + V_{AC} \cdot [I_A - I_B]$$

the digits in each of said expressions representing the relative number of turns of the current windings and the algebraic signs representing the relative polarity of energization.

4. In combination with a three-phase, three wire network alternating-current system having three phase-conductors identified in the order of conventional phase rotation A, B, C, carrying currents $I_A$, $I_B$ and $I_C$ and a neutral conductor carrying a current $I_N$, said system having a voltage $V_{AN}$ between the phase-conductor A and the neutral conductor and a voltage $V_{CN}$ between phase-conductor C and the neutral conductor, a device for measuring a reactive component of the system comprising a multi-element meter having a first and a second watt-responsive element, each of said elements including at least one voltage winding and a plurality of current windings IA and IC, means connecting the voltage winding of the first of said elements to the system to develop a flux in accordance with the expression $V_{CN}$, means for connecting the current windings of said first element to the system to develop a flux in accordance with the expression $[-I_A+2I_C]$, means for connecting the voltage winding of the second of said elements to the system to develop a flux in accordance with the expression $V_{AN}$, means for connecting the current windings of said second element to the system to develop a flux in accordance with the expression $[-2I_A+I_C]$, and a common indicating means mounted for displacement by the fluxes developed by said first and second elements to provide a meter response proportional to the expression $V_{CN} [-I_A+2I_C] + V_{AN} [-2I_A+I_C]$, the digits in each of said expressions representing the relative number of turns of the current windings and the algebraic signs representing the relative polarity of energization.

5. In combination with a three-phase, four-wire, Y-connected alternating current system having three phase-conductors identified in the order of conventional phase rotation A, B, C carrying currents $I_A$, $I_B$, $I_C$ and a neutrol conductor N carrying a current $I_N$, said system having voltages $V_{AN}$ and $V_{CN}$ between phase conductors A and C respectively and the neutral conductor N, a varhour meter for measuring a reactive component of the system comprising first and second meter elements, said first meter element including a voltage winding and first, second and third current windings, said first current winding having substantially twice the number of turns as said second and third current windings, said second meter element including a voltage winding and first, second and third current windings, said third current winding of said second meter element having substantially twice the number of turns as the first and second current windings of said second meter element, means for rendering said voltage windings responsive to said voltages $V_{AN}$ and $V_{CN}$, a first series circuit responsive to the current flow through one of said phase-conductors passing in series in a sense opposite a reference sense through the first current winding of said second meter element and in said opposite sense through said first current winding of said first meter element, a second series circuit responsive to the current flow through a second of said phase-conductors passing in series in said opposite sense through the second current winding of said second meter element and in said reference sense through the second current winding of said first meter element, and a third series circuit responsive to the current flow through the third of said phase-conductors passing in series in said reference sense through the third current winding of said second meter element and in said reference sense through the third current winding of said first meter element.

6. In combination with a three-phase, four-wire, Y-connected alternating current system having three phase-conductors identified in the order of conventional phase rotation A, B, C carrying currents $I_A$, $I_B$, $I_C$ and a neutral conductor N carrying a current $I_N$, said system having voltages $V_{AN}$ and $V_{CN}$ between phase conductors A and C respectively and the neutral conductor N, a varhour meter for measuring a reactive component of the system comprising first and second meter elements, said first meter element including a voltage winding and first, second and third current windings, said first current winding having substantially twice the number of turns as said second and third current windings, said second meter element including a voltage winding and first second and third current windings, said third current winding of said second meter element having substantially twice the number of turns as the first and second current windings of said second meter element, means for rendering said voltage windings responsive to said voltages $V_{AN}$ and $V_{CN}$, a first series circuit responsive to the current flow through one of said phase-conductors passing in series in a direction opposite a given direction through said first current winding of said second meter element and in said opposite direction through the first current winding of said first meter element, a second series circuit responsive to the current flow through a second of said phase-conductors passing in series in said opposite direction through the second current winding of said second meter element and in said given direction through the second current winding of said first meter element, and a third series circuit responsive to the current flow through the third of said phase-conductors passing in series in said given direction through the third current winding of said second meter element and in said given direction through the third current winding of said first meter element, said first, second and third series circuits being electrically isolated from each other.

7. In combination with a three-wire, three-phase, delta-connected alternating current system having three phase-conductors identified in the order of conventional phase rotation A, B, C carrying currents $I_A$, $I_B$, $I_C$, said system having voltages $V_{AB}$ and $V_{CB}$ between the phase-conductors A and B and C and B respectively, a varhour meter for measuring a reactive component of the system comprising first and second meter elements, said first meter element including a voltage winding and first and second current windings, said second current winding having substantially twice the number of turns as said first current winding, said second meter element including a voltage winding and first and second current windings, the second current winding of said second meter element having substantially twice the number of turns as the first current winding of said second meter element, means for rendering said voltage windings responsive to said voltages, a first series circuit responsive to the current flow through one of said phase-conductors passing in series in a reference sense through the first current winding of said first meter element and in a sense opposite said reference sense through the second current winding of said second meter element, and a second series circuit responsive to the current flow through another of said phase-conductors and passing in series in said opposite sense through the first current winding of said second meter element and in said reference sense through the second current winding of said first meter element.

8. In combination with a three-phase, three-wire, delta-connected alternating current system having three-phase conductors identified in the order of conventional phase rotation A, B, C carrying currents $I_A$, $I_B$, $I_C$, said system having voltages $V_{AB}$ and $V_{BC}$ between the phase-conductors A and B and between the phase-conductors B and C respectively, a varhour meter for measuring a reactive component of the system comprising first and second watt-responsive meter elements, said first meter element including a voltage winding and first and second current windings cooperating with said voltage winding, said second current winding having substantially twice the number of turns as said first current winding, said second meter element including a voltage winding and first and second current windings cooperating with said latter voltage winding, the second current winding of said second meter element having substantially twice the number of turns as the first current winding of said second meter element, connections for rendering said voltage windings responsive to said voltages $V_{AB}$ and $V_{BC}$, a first series circuit responsive to the current flow through one of said phase-conductors passing in series in a given direction through the first current winding of said first meter element and in a direction opposite said given direction through the second current winding of said second meter element, and a second series circuit responsive to the current flow through another of said phase-conductors and passing in series in said opposite direction through the first current winding of said second meter element and in said given direction through the second current winding of said first meter element, said first and second series circuits being electrically isolated from each other.

9. In combination with a three-phase, four-wire delta-connected alternating current system having three phase-conductors identified in the order of conventional phase rotation A, B, C carrying currents $I_A$, $I_B$ and $I_C$ and a neutral conductor carrying current $I_0$, said system having voltages $V_{AB}$ and $V_{AC}$ between the phase-conductors A—B and A—C respectively, a varhour meter for measuring a reactive component of the system comprising first and second meter elements, said first meter element including a voltage winding and first and second current windings, said first and second current windings both having N number of turns, said second meter element including a voltage winding and first, second and third current windings, said first current winding of said second meter element having $$\frac{3}{2}N$$

number of turns, the second and third current windings of said second meter element having $$\frac{N}{2}$$

number of turns, connections for rendering said voltage windings responsive to said voltages, a first series circuit responsive to the current flow through one of said phase conductors passing in series in a reference sense through the first current windings of said first meter element and in a sense opposite said reference sense through the third current winding of said second meter element, a second series circuit responsive to the current flow through a second of said phase-conductors passing in series in said opposite sense through the second current winding of said first meter element and in said reference sense through the second current winding of said second meter element, and a third series circuit responsive to the current flow through the third of said phase-conductors passing in said reference sense through said first current winding of said second meter element.

10. In combination with a three-phase, four-wire delta-connected alternating current system having three phase-conductors identified in the order of conventional phase rotation A, B, C carrying currents $I_A$, $I_B$ and $I_C$ and a neutral conductor carrying current $I_0$, said system having voltages $V_{AB}$ and $V_{AC}$ between the phase-conductors A—B and A—C respectively, a varhour meter for measuring a reactive component of the system comprising first and second meter elements, said first meter element including a voltage winding and first and second current windings, said first and second current windings both having N number of turns, said second meter element including a voltage winding and first, second and third current windings, said first current windings of said second meter element having $$\frac{3}{2}N$$

number of turns, the second and third current windings of said second meter element having $$\frac{N}{2}$$

number of turns, connections for rendering said voltage windings responsive to said voltages $V_{AB}$ and $V_{AC}$ between the phase-conductors A and B and between the phase-conductors A and C respectively, a first series circuit responsive to the current flow through one of said phase-conductors passing in series in a given direction through the first current winding of said first meter element and in a direction opposite said given direction through the third current winding of said second meter element, a second series circuit responsive to the current flow through a second of said phase-conductors passing in series in said opposite direction through the second current winding of said first meter element and in said given direction through the second current winding of said second meter element, and a third series circuit responsive to the current flow through the third of said phase-conductors passing in said given direction through said first current winding of said second meter element, said first, second and third series circuits being electrically isolated from each other.

11. In combination with a three-phase, four-wire Y-connected alternating current source comprising three Y-connected transformer secondaries having three-phase conductors A', B', C' and a neutral conductor N' extending therefrom, a three-wire network service system including phase-conductors A' and C' and neutral conductor N', said phase-conductors A' and C' carrying currents $I_A$ and $I_C$, said three-wire network system having voltages $V_{AN}$ and $V_{CN}$ between said phase-conductors and said neutral conductor, and a varhour meter for measuring a reactive component of said three-wire network service system comprising first and second meter elements, said first meter element including a voltage winding and first and second current windings, said second current winding having substantially twice the number of turns as said first current winding, said second meter element including a voltage winding and first and second current windings, said second current winding of said second meter element having substantially twice the number of turns as said first current winding of said second meter element, means for rendering said voltage windings responsive to said voltages between phase-conductors A' and C' and neutral conductor N', a first series circuit responsive to the current flow through one of said phase-conductors passing in series in a sense opposite a reference sense through the second current winding of said second meter element and in said opposite sense through the first current winding of said first meter element, and a second series circuit responsive to the current flow through the other of said phase-conductors passing in series in said reference sense through the second current winding of the first meter element and in said reference sense through the first current winding of the second meter element.

12. In combination with a three-phase, four-wire, Y-connected alternating current source comprising three Y-connected transformer secondaries having three-phase conductors A', B', C' and a neutral conductor N' extending therefrom, a three-wire network service system including phase-conductors A' and C' and neutral conductor N', said phase-conductors A' and C' carrying currents $I_A$ and $I_C$, said three-wire network system having voltages $V_{AN}$ and $V_{CN}$ between said phase-conductors and said neutral conductor, and a varhour meter for measuring a reactive component of said three-wire network service system comprising first and second meter elements, said first meter element including a voltage winding and first and second current windings, said second current winding having substantially twice the number of turns as said first current winding, said second meter element including a voltage winding and first and second current windings, said second current winding of said second meter element having substantially twice the number of turns as said first current winding of said second meter element, means for rendering said voltage windings responsive to said voltages between phase-conductors A' and C' and neutral conductor N', a first series circuit responsive to the current flow through one of said phase-conductors passing in series in a direction opposite a given direction through the second current winding of said second meter element and in said opposite direction through the first current winding of said first meter element, and a second series circuit responsive to the current flow through the other of said phase conductors passing in series in said given direction through the second current winding of the first meter element and in said given direction through the first current winding of the second meter element, said first and second series circuits being electrically isolated from each other.

13. In combination with a three phase, four-wire Y-connected alternating current system having three phase-conductors identified in the order of conventional phase rotation A, B, C carrying currents $I_A$, $I_B$ and $I_C$, and having a neutral conductor N, said system having a voltage $V_{AN}$ between the phase-conductor A and the neutral conductor N and a voltage $V_{CN}$ between phase-conductor C and neutral conductor N, a device for measuring volt amperes on the system comprising a multi-element meter having a first and a second watt-responsive element, the first of said elements including at least one voltage winding and a plurality of current windings IC and IB, and the second of said elements including at least one voltage winding and a plurality of current windings IC and IA, means connecting the voltage winding of the first of said elements to the system to develop a flux in accordance with the expression $V_{AN}$, means for connecting the current windings of said first element to the system to develop a flux in accordance with the expression $(I_C - I_B)$, means for connecting the voltage winding of the second of said elements to the system to develop a flux in accordance with the expression $V_{CN}$, means for connecting the current windings of said second element to the system to develop a flux in accordance with the expression $(I_C - I_A)$, and a common indicating means mounted for displacement by the fluxes developed by said first and second elements to provide a meter response proportional to the expression $$V_{AN}(I_C - I_B) + V_{CN}(I_C - I_A)$$

the digits in each of said expressions representing the relative number of turns of the current windings and the algebraic signs representing the relative polarity of energization.

14. In combination with a three-wire, three-phase, delta-connected alternating current system having three phase-conductors identified in the order of conventional phase rotation A, B, C, carrying currents $I_A$, $I_B$, $I_C$, said system having voltages $V_{AB}$ and $V_{CB}$ between the phase-conductors A and B and C and B respectively, a device for measuring volt-amperes of the system comprising a multi-element meter having a first and a second watt-responsive element, the first of said elements including at least one voltage winding and a plurality of current windings IA and IC, and the second of said elements including at least one voltage winding and at least one current winding IA, means connecting the voltage winding of the first of said elements to the system to develop a flux in accordance with the expression $V_{AB}$, means for connecting the current windings of said first element to the system to develop a flux in accordance with the expression $(I_A+I_C)$, means for connecting the voltage winding of the second of said elements to the system to develop a flux in accordance with the expression $V_{CB}$, means for connecting the current winding of said second element to the system to develop a flux in accordance with the expression $(-I_A)$, and a common indicating means mounted for displacement by the fluxes developed by said first and second elements to provide a meter response proportional to the expression $V_{AB}(I_A+I_C)+V_{CB}(-I_A)$, the digits in each of said expressions representing the relative number of turns of the current windings and the algebraic signs representing the relative polarity of energization.

15. In combination with a three-phase, four-wire delta-connected alternating-current system having three phase-conductors arranged in the order of conventional phase rotation A, B, C carrying currents $I_A$, $I_B$, $I_C$ and a neutral conductor carrying a current $I_N$, said system having voltages $V_{AB}$ and $V_{AC}$ between the phase-conductors A, B and A, C respectively, a device for measuring volt-amperes of the system comprising a multi-element meter having a first and a second watt-responsive element, the first of said elements including at least one voltage winding and at least one current winding IC, and the second of said elements including at least one voltage winding and a plurality of current windings IA, IB and IC, means connecting the voltage winding of the first of said elements to the system to develop a flux in accordance with the expression $V_{AB}$, means for connecting the current winding of said first element to the system to develop a flux in accordance with the expression $I_C$, means for connecting the voltage winding of the second of said elements to the system to develop a flux in accordance with the expression $V_{AC}$, means for connecting the current windings of said second element to the system to develop a flux in accordance with the expression $$\left(\frac{I_A-I_B-I_C}{2}\right)$$

and a common indicating means mounted for displacement by the fluxes developed by said first and second elements to provide a meter response proportional to the expression $$V_{AB} \cdot I_C + V_{AC}\left(\frac{I_A-I_B-I_C}{2}\right)$$

the digits in each of said expressions representing the relative number of turns of the current windings and the algebraic signs representing the relative polarity of energization.

16. In combination with a three-phase, three-wire network alternating-current system having three phase-conductors identified in the order of conventional phase rotation A, B, C, carrying currents $I_A$, $I_B$ and $I_C$ and a neutral conductor carrying a current $I_N$, said system having a voltage $V_{AN}$ between the phase-conductor A and the neutral conductor and a voltage $V_{CN}$ between phase-conductor C and the neutral conductor, a device for measuring volt-amperes of the system comprising a multi-element meter having a first and a second watt-responsive element, the first of said elements including at least one voltage winding and at least one current winding IC, and the second of said elements including at least one voltage winding and a plurality of current windings IA and IC, means connecting the voltage winding of the first of said elements to the system to develop a flux in accordance with the expression $V_{AN}$, means for connecting the current windings of said first element to the system to develop a flux in accordance with the expression $I_C$, means for connecting the voltage winding of the second of said elements to the system to develop a flux in accordance with the expression $V_{CN}$, means for connecting the current windings of said second element to the system to develop a flux in accordance with the expression $(-I_A+I_C)$, and a common indicating means mounted for displacement by the fluxes developed by said first and second elements to provide a meter response proportional to the expression $$V_{AN} \cdot I_C + V_{CN}(-I_A+I_C)$$

the digits in each of said expressions representing the relative number of turns of the current windings and the algebraic signs representing the relative polarity of energization.

17. In combination with a three-phase, four-wire Y connected alternating current system having three phase-conductors identified in the order of conventional phase rotation A, B, C carrying currents $I_A$, $I_B$, $I_C$ and a neutral conductor N carrying a current $I_N$, said system having a voltage $V_{AN}$ between the phase-conductor A and the neutral conductor N and a voltage $V_{CN}$ between phase-conductor C and the neutral conductor N, a device for measuring volt-amperes on the system comprising a multi-element meter having a first and a second watt-responsive element, each of said elements including at least one voltage winding and a plurality of current windings IA, IB and IC, means connecting the voltage winding of the first of said elements to the system to develop a flux in accordance with the expression $V_{AN}$, means for connecting the current windings of said first element to the system to develop a flux in accordance with the expression $(I_A-2I_B+I_C)$, means for connecting the voltage winding of the second of said elements to the system to develop a flux in accordance with the expression $V_{CN}$, means for connecting the current windings of said second element to the system to develop a flux in accordance with the expression $(-I_A-I_B+2I_C)$, and a common indicating means mounted for displacement by the fluxes developed by said first and second elements to provide a meter response proportional to the expression $$V_{AN}(I_A-2I_B+I_C)+V_{CN}(-I_A-I_B+2I_C)$$

the digits in each of said expressions representing the relative number of turns of the current windings and the algebraic signs representing the relative polarity of energization.

18. In combination with a three-wire, three-phase, delta-connected alternating current system having three phase-conductors identified in the order of conventional phase rotation A, B, C, carrying currents $I_A$, $I_B$, $I_C$, said system having voltages $V_{AB}$ and $V_{CB}$ between the phase-conductors A and B and C and B respectively, a device for measuring volt-amperes of the system comprising a multi-element meter having a first and a second watt-responsive element, each of said elements including at least one voltage winding and a plurality of currents windings IA and IC, means connecting the voltage winding of the first of said elements to the system to develop a flux in accordance with the expression $V_{AB}$, means for connecting the current windings of said first element to the system to develop a flux in accordance with the expression $(2I_A+I_C)$, means for connecting the voltage winding of the second of said elements to the system to develop a flux in accordance with the expression $V_{CB}$, means for connecting the current windings of said second element to the system to develop a flux in accordance with the expression $(-I_A+I_C)$, and a common indicating means mounted for displacement by the fluxes developed by said first and second elements to provide a meter response proportional to the expression $$V_{AB}(2I_A+I_C)+V_{CB}(-I_A+I_C)$$

the digits in each of said expressions representing the relative number of turns of the current windings and the algebraic signs representing the relative polarity of energization.

19. In combination with a three-phase, four-wire delta-connected alternating-current system having three phase-conductors arranged in the order of conventional phase rotation A, B, C carrying currents $I_A$, $I_B$, $I_C$ and a neutral conductor carrying a current $I_N$, said system having voltages $V_{AB}$ and $V_{AC}$ between the phase-conductors A, B and A, C respectively, a device for measuring volt-amperes of the system comprising a multi-element meter having a first and a second watt-responsive element, each of said elements including at least one voltage winding and a plurality of current windings IA, IB and IC, means connecting the voltage winding of the first of said elements to the system to develop a flux in accordance with the expression $V_{AB}$, means for connecting the current windings of said first element to the system to develop a flux in accordance with the expression $$\left[\frac{I_A-I_B}{2}+\frac{3I_C}{2}\right]$$

means for connecting the voltage winding of the second of said elements to the system to develop a flux in accordance with the expression $V_{AC}$, means for connecting the current windings of said second element to the system to develop a flux in accordance with the expression $$\left(\frac{I_A-I_B}{2}-\frac{3I_C}{2}\right)$$

and a common indicating means mounted for displacement by the fluxes developed by said first and second elements to provide a meter response proportional to the expression $$V_{AB}\left[\frac{I_A-I_B}{2}+\frac{3I_C}{2}\right]+V_{AC}\left[\frac{I_A-I_B}{2}-\frac{3I_C}{2}\right]$$

the digits in each of said expressions representing the relative number of turns of the current windings and the algebraic signs representing the relative polarity of energization.

20. In combination with a three-phase, three-wire network alternating-current system having three phase-conductors identified in the order of conventional phase rotation A, B, C, carrying currents $I_A$, $I_B$ and $I_C$ and a neutral conductor carrying a current $I_N$, said system having a voltage $V_{AN}$ between the phase-conductor A and the neutral conductor and a voltage $V_{CN}$ between phase-conductor C and the neutral conductor, a device for measuring volt-amperes of the system comprising a multi-element meter having a first and a second watt-responsive element, each of said elements including at least one voltage winding and a plurality of current windings IA and IC, means connecting the voltage winding of the first of said elements to the system to develop a flux in accordance with the expression $V_{AN}$, means for connecting the current windings of said first element to the system to develop a flux in accordance with the expression $(I_A+I_C)$, means for connecting the voltage winding of the second of said elements to the system to develop a flux in accordance with the expression $V_{CN}$, means for connecting the current windings of said second element to the system to develop a flux in accordance with the expression $(-I_A+2I_C)$, and a common indicating means mounted for displacement by the fluxes developed by said first and second elements to provide a meter response proportional to the expression $V_{AN}(I_A+I_C)+V_{CN}(-I_A+2I_C)$, the digits in each of said expressions representing the relative number of turns of the current windings and the algebraic signs representing the relative polarity of energization.

References Cited in the file of this patent

UNITED STATES PATENTS

| | | |
|---|---|---|
| 1,732,687 | Lenehan | Oct. 22, 1929 |
| 2,573,407 | Coleman | Oct. 30, 1951 |

FOREIGN PATENTS

| | | |
|---|---|---|
| 907,979 | France | Mar. 27, 1946 |